United States Patent Office 3,196,151
Patented July 20, 1965

3,196,151
DERIVATIVES OF 7-AMINOCEPHALOSPORANIC ACID
John R. E. Hoover, Glenside, and James W. Wilson, Wayne, Pa., assignors to Smith Kline & French Laboratories, Philadelphia, Pa., a corporation of Pennsylvania
No Drawing. Filed Nov. 8, 1960, Ser. No. 67,926
8 Claims. (Cl. 260—243)

This invention relates to novel organic compounds possessing valuable chemotherapeutic activity and more specifically antimicrobial activity.

Heretofore, a major difficulty encountered in antimicrobial therapy has been the susceptibility of the particular compound to enzymatic degradation within the infected animal's body. Thus, penicillin G, while effective against a great number of micro-organisms, shows little effect in tolerable doses against certain other microorganisms, notably the so called "penicillin resistant" strains of Staphylococci. To date efforts to overcome this difficulty by substituting other side chain in place of benzylcarboxy side chains of penicillin G have met with only limited success for those synthetic penicillins which do demonstrate activity against the penicillin resistant Staph., generally also exhibit a poorer profile of other important properties, such as for example, low absorption administered via the oral route.

A different approach to the problem of "penicillin resistant" Staph. has found an answer in the use of other antibiotic nuclei, notably 7-aminocephalosporanic acid and certain related heterocyclic compounds which are the subjects of copending applications. These nuclei apparently possess an inherent resistance to penicillinase and their derivatives wherein the side chain corresponds to the side chain of susceptible penicillin as for example benzylcarboxy, are not appreciably affected by penicillinase.

There appears however, to exist an enzyme (or enzymes) other than penicillinase which is effective in destroying the activity of these cephalosporanic acid derivatives. This enzyme has been tentatively classified by its activity against many cephalosporanic acid derivatives and has been designated for the sake of convenience the name "cephalosporinase."

We have now discovered a novel class of compounds which demonstrates resistance not only to penicillinase but to cephalosporinase as well and which at the same time possess antimicrobial activity against a wide variety of micro-organisms.

The object of this invention is thus to provide novel antimicrobial compounds possessing improved resistance to enzymatic degradation. In particular, our novel compounds possess resistance to the enzyme penicillinase.

Another object of this invention is to provide antimicrobial agents having resistance to other antibiotic destroying enzymes.

A further object is to provide antimicrobial agents which have this aforementioned enzyme resistance and which also have other advantageous physiological properties.

Other objects of this invention will be apparent hereafter.

In particular, the compounds of this invention may be represented by the following structural formula:

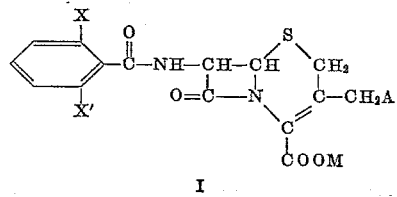

I wherein A is a member selected from the group consisting of lower alkanoyloxy, benzoyloxy, hydroxy, pyridinium, and when taken together with M, a monovalent carbon-oxygen bond; M is selected from the group consisting of hydrogen, pharmaceutically acceptable cations including internal molecular cationic charge, and when taken together with A, a monovalent carbon-oxygen bond; and X and X' are selected from the group consisting of halogen, lower alkyl, lower alkoxy, nitro, benzyl and benzyloxy. More specifically A is selected from the group consisting of lower alkanoyloxy, benzoyloxy, hydroxyl, pyridinium, and a carbon-oxygen bond to the carboxylic acid radical. In those instances where A is pyridinium, the cationic charge on this group is matched by the anionic charge of the carboxylic acid radical, the entire molecule being of a Zwitterionic nature and the cationic charge of the pyridinium group thus comprising M. The symbol A also represents hydroxyl or the lower alkanoic acid esters and the benzoic acid esters thereof. The hydroxyl group embraced by A may alternatively be esterified internally by the carboxylic acid radical of the heterocyclic nucleus thereby forming a lactone ring as represented when A and M taken together comprise a monovalent carbon-oxygen bond.

Also embraced within the scope of the present invention are the non-toxic pharmaceutically acceptable salts of the above carboxylic acid radical. The cations comprised in these salts and embraced by M include for example, the alkali metal ions, as for instance the sodium ion, potassium ion, calcium ion as well as the ammonium radical and the organic amine cations, such as the lower alkyl ammonium groups, as for instance triethylammonium.

The groups X and X' are selected from the group consisting of halogeno such as chloro, bromo, iodo, and fluoro; lower alkyl such as methyl, ethyl, i-propyl, pentyl and the like; lower alkoxy such as methoxy, ethoxy, butoxy and the like; nitro, benzyl and the substituted analogs thereof such as toluyl, nitrobenzyl, chlorobenzyl and the like; phenoxy, benzyloxy and the substituted analogs thereof such as toluoxy, nitrophenoxy, chlorophenoxy and the like.

The groups X and X' may be but are not necessarily the same. By the terms alkyl, alkanoyloxy and alkoxy when employed in regard to this invention, is intended a group embracing a branched or straight chained hydrocarbon group containing from one to six carbon atoms.

The terms benzyl, phenoxy, and benzyloxy include these unsubstituted groups as well as these groups when substituted by the usual substituents such as halogen, lower alkyl, lower alkoxy, nitro, amino, hydroxy and the like.

The compounds of our invention are prepared by treating a compound of the structure

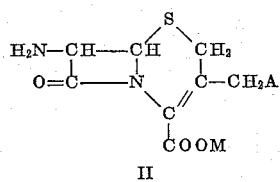

with the appropriately substituted benzoyl chloride, benzoic acid anhydride, or the mixed anhydride obtained from a benzoic acid and a lower alkyl chloroformate and isolating the product thereby formed. In general, this reaction may be represented as follows:

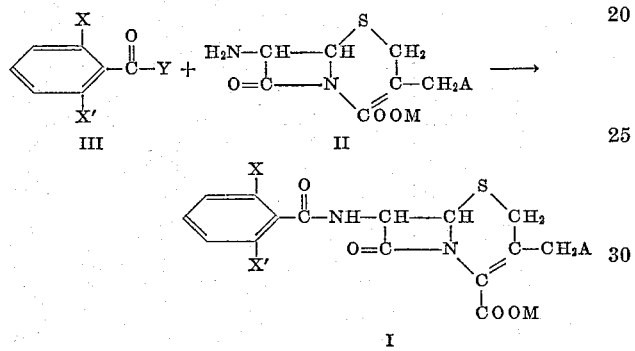

wherein Y represents halogeno, acyloxy, or

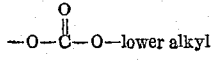

The starting materials whose structures are represented by Formula II include for example, 7-aminocephalosporanic acid and certain related derivatives of 7-aminocephalosphoranic acid. This heterocyclic compound, 7-amino-cephalosporanic acid can be prepared from the antibiotic substance cephalosporin C whose physical and antimicrobial properties are known to the art and whose structure is represented by the structural formula:

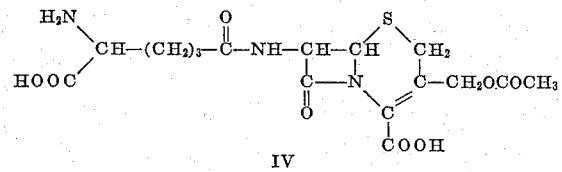

Upon hydrolysis of cephalosporin C, as for example acid hydrolysis, there is formed α-aminoadipic acid and 7-aminocephalosporanic acid whose structure may be represented by the formula:

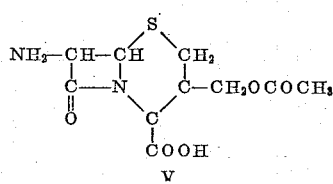

In addition to the formation of 7-aminocephalosporanic acid upon hydrolysis of cephalosporin C, there is also further formed by hydrolysis of the acetyloxy grouping and subsequent internal esterification, the lactone having the formula:

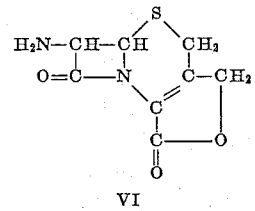

These two products designated by Formula V and Formula VI are readily separated by virtue of the different physical properties, as for example, by chromatographic techniques.

We have found it further possible to modify the structure of 7-aminocephalosporanic acid by enzymatic cleavage of the acetyloxy grouping without subsequent lactone formations. There is thus formed the compound 3-hydroxymethyl-7-aminodecephalosporanic acid represented by the formula:

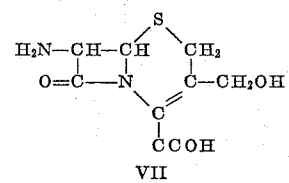

The designation decephalosporanic acid is herein employed for purposes of nomenclature only and intended to represent the basic heterocyclic acid nucleus having the formula:

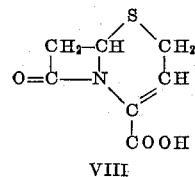

This cleavage of the acetyloxy grouping to form 3-hydroxymethyl - 7 - aminodecephalosporanic acid without subsequent lactone formations may be accomplished by employing enzymatic means, as for example, by the action of an acetylesterase. Such suitable enzyme preparations may be obtained for example, from citrus fruits such as oranges, grapefruit, lemons and the like, as described by Jansen et al., Arch. Biochem., 15, 415 (1957). Preparations of such an enzyme advantageously effect hydrolysis of the acetyloxy side chain without subsequent lactone formation. The resultant hydroxy group may then be further modified as by re-esterification with a lower alkanoic acid radical or a benzoic acid radical so as to form the lower alkanoate esters homologous to the acetate ester present in the naturally occurring cephalosporin C or the corresponding benzoate ester.

As the conditions and reagents employed in acylating hydroxyl groups are similar to those for acylating amino groups, it is generally desirable in practice to effect acylation of the hydroxymethyl group in the 3-position of decephalosporanic acid, after formation of the carboxyamido group in the 7-position. Deacetylation on either cephalosporin C or 7-aminocephalosporanic acid according to the enzymatic techniques discussed herein followed by reacylation of the resultant hydroxyl group generally results in concurrent acylation of the amino group in the 7-position of 7-aminocephalosporanic acid respectively. Thus in practice, cephalosporin C is cleaved by acid hydrolysis as herein described to yield 7-aminocephalosporanic acid which in turn is subjected to the procedure of this invention to obtain the 7-carboxyamido derivative of cephalosporic acid. This compound may then be treated with acetylesterase as herein described to yield the corresponding compound containing a hydroxymethyl group in the 3-position which in turn is reacylated by methods analogous to those known to the art, such as for example, by means of an acyl halide or acid anhydride.

Treatment of cephalosporin C with a tertiary base such as for example, pyridine, quinoline, or collidine prior to acidic hydrolytic cleavage of the aminoadipic acid side chain forms a quarternary salt derivative of cephalosporin C which when hydrolyzed yields a nucleus which, in the case of pyridine, has been assigned the name, 3-pyridiniummethyl - 7 - aminodecephalosporanic acid inner salt and the structure:

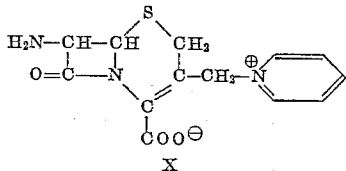

X

Several of the requisite 2, 6-disubstituted benzoic acids employed as starting materials are readily available. Those which are not can be prepared by methods analogous to those known in the art.

The preferred compounds of our invention are those of Formula I wherein X and X' represent methoxy, A represents lower alkanoyloxy or benzoyloxy, and M represents hydrogen or a pharmaceutically acceptable cation.

The following examples will serve to further typify the nature of our invention; however these examples should not be construed as restricting the scope of this invention, the scope being defined only by the appended claims.

*Example 1*

Four grams of cephalosporin C as the sodium salt are dissolved in 60 ml. of water and the pH adjusted to 2.5 by the addition of the acid form of Dowex 50 (x8). The resin is filtered and washed with 20 ml. of water and to the combined filtrate and washings are added 20.5 ml. of 0.1 N hydrochloric acid. The mixture is allowed to stand for 72 hours at 20° C. and at the end of this time, introduced into a column of Dowex-1 (as the acetate forms), 2 cm. x 10 cm. The initial percolate is collected in 10 ml. fractions and upon the collection of fraction 12 the column is eluted with water until a total of 34 fractions have been collected. The column is thereupon eluted with 0.5 N acetic acid and an additional 65 fractions collected.

Fractions 36 through 45 are combined and concentrated by freeze drying to yield 7-aminocephalosporanic acid.

Fractions 2 through 16 are combined and concentrated in vacuo to yield the lactone of desacetyl cephalosporin C which when resubjected to the above acid hydrolysis procedure yields 3 - hydroxymethyl-7-aminocephalosporanic acid lactone.

By increasing the concentration of the acid in the above procedure from 0.1 N to 1.0 N and the length of reaction to four days, the amounts of desacetyl cephalosporin C lactone and 3-hydroxymethyl-7-aminocephalosporanic acid lactone are increased.

*Example 2*

A. One gram of cephalosporin C as the sodium salt is dissolved in 50 ml. of water. There is then added sufficient Dowex 50 (x8) resin as the hydrogen form to adjust the pH to 2.6. The resin is removed by filtration and to the filtrate is added 3.8 ml. of pyridine, the pH rising to approximately 6.5. The solution is maintained in a glass container at 37° C. for 48 hours. At the end of this time the solution is freezed dried and the residue, triturated twice with 50 ml. of acetone and redried. The solid is then dissolved in 10 ml. of water and introduced onto a Dowex 1 (x10) acetate column (2 cm. x 10 cm.). The column is eluted with water and 10 ml. fractions are collected. Fractions 2 through 4 are then combined and freezed dried to yield the pyridinium inner salt of desacetyl cephalosporin C.

B. This material is then subjected to the acidic hydrolytic procedure as described in Example 1. Upon chromatographic separation as described therein, the earlier fractions collected are combined and reduced to a residue to yield 3-pyridiniummethyl-7-aminodecephalosporanic acid inner salt. The latter fractions are combined and concentrated to a residue to yield the pyridinium inner salt of desacetyl cephalosporin C which may be resubjected to the hydrolytic procedure to yield additional material.

*Example 3*

A. A solution of 1.56 g. (.0086 mole) of 2,6-dimethoxybenzoic acid in 20 ml. of acetone is cooled in an ice bath to 0°. To the cooled solution is added 1.02 g. (.01 mole) of triethylamine in 10 ml. of acetone. The temperature of the reaction mixture is maintained at 0° and a solution of 1.25 g. (.011 mole) of ethylchloroformate in 4.5 ml. of acetone is added in a dropwise fashion with stirring. The reaction mixture is stirred for 30 minutes and allowed to gradually attain room temperature after which time it is filtered. The filtrate thus obtained is added slowly to a stirred solution of 2.72 g. (0.01 mole) of 7-aminocephalosporanic acid in 90 ml. of 3% aqueous sodium bicarbonate solution and 50 ml. of acetone. Upon completion of the addition, the mixture is allowed to attain room temperature and stirring continued for an additional one-half hour. The mixture is then extracted three times with portions of 30 ml. of ether and the resultant aqueous solution then adjusted to pH 2.5 by the addition of concentrated sulfuric acid. During this adjustment the temperature is maintained at a level below 10°. Upon reaching pH 2.5 the solution is extracted with 25 ml. of butyl acetate followed by two additional extractions of 10 ml. The butyl acetate extracts are washed once with water and then an additional 25 ml. of water are added and the pH adjusted to 8.0 by the addition of solid potassium bicarbonate with agitation. The aqueous layer is separated, filtered and adjusted to pH 2.0 by the addition of concentrated sulfuric acid at a temperature below 10°. The resultant acidic aqueous mixture is in turn extracted twice with 20 ml. of butyl acetate, washed once with water and dried over sodium sulfate. To the dried butyl acetate solution is added with vigorous stirring a solution of potassium hydride in n-butanol (40 g./l.) until the pH of the reaction mixture is 8.4. The mixture is cooled until crystallization occurs and the crystals so formed are collected by centrifugation, washed with a small amount of acetone and dried. The dried crystals are dissolved in a minimum quantity of acetone: water (9:1) and precipitated by the addition of anhydrous acetone. These crystals are collected and dried to yield 7 - (2,6 - dimethoxyphenylcarboxyamido) - cephalosporanic acid as the potassium salt.

Treatment of an aqueous solution of the potassium salt with hydrogen chloride and extraction with ether then yields the free acid 7-(2,6-dimethoxyphenylcarboxyamido)-cephalosporanic acid.

B. Alternatively, 3.64 g. (0.02 mole) of 2,6-dimethoxybenzoic acid is allowed to react with 11 ml. of thionyl chloride at room temperature overnight. The resulting solution is evaporated in vacuo at 35° C. and to the oil so obtained is added 25 ml. of benzene and the mixture then re-evaporated. After adding an additional 25 ml. of benzene and repeating the process, the residual oil is held under vacuum to remove any traces of thionyl chloride and 4 g. of the oil then dissolved in 50 ml.

of dried acetone. This solution is added slowly with stirring to 5.4 g. of 7-aminocephalosporanic acid in 190 ml. of 3% sodium bicarbonate and 120 ml. of acetone. The reaction mixture is maintained at 25° for 1½ hours, extracted twice with 150 ml. of ether and to the residual aqueous solution is added 40 ml. of butyl acetate. This mixture is cooled to below 10°, adjusted to pH 2.4 with 20% phosphoric acid and the phases separated. The aqueous phase is extracted with 15 ml. of butyl acetate and the combined butyl extracts washed with 10 ml. of water adjusted to pH 3. The washed organic solution is then dried over magnesium sulfate, filtered and to the filtrate is added 9.6 ml. of 30% potassium-2-ethylhexanoate in isopropanol. One volume of ether is then added with stirring and the crystals which form upon cooling are collected by filtration, washed with 1:1 ether butyl acetate, then with ether alone and finally dried to yield 7 - (2,6 - dimethoxyphenylcarboxyamido) - cephalosporanic acid as the potassium salt.

Treatment of potassium salt with hydrogen chloride and extraction with ether then yields the free acid 7-(2,6 - dimethoxyphenylcarboxyamido) - cephalosporanic acid.

*Example 4*

2,6-dichlorobenzoic acid (3.82 g.) is substituted for 2,6-dimethoxybenzoic acid in the procedure of Example 3B. The product so obtained upon completion of the steps therein described, 7-(2,6-dichlorophenylcarboxyamido)-cephalosporanic acid as the potassium salt is converted to the free acid by treatment of an aqueous solution with hydrogen chloride.

In a similar manner, equivalent amounts of the following 2,6-disubstituted benzoic acids are employed in the procedure of Example 3B: 2,6-di-n-butoxybenzoic acid, 2,6-dimethylbenzoic acid, 2,6-dibenzyloxybenzoic acid, and 2-methoxy-6-ethoxybenzoic acid. There is thus obtained upon completion of the steps therein described the following compounds as the potassium salt: 7-(2,6-di-n-butoxyphenylcarboxyamido)-cephalosporanic acid, 7-(2,6-dimethylphenylcarboxyamido)-cephalosporanic acid, 7-(2,6 - dibenzyloxyphenylcarboxyamido)-cephalosporanic acid, and 7-(2-methoxy-6-ethoxyphenylcarboxyamido)-cephalosporanic acid.

*Example 5*

The procedure as described in Example 3A is employed, substituting the following benzoic acids for 2,6-dimethoxybenzoic acid described therein and employing equivalent quantities thereof: 2,6-dibromobenzoic acid, 2,6-diethylbenzoic acid, 2,6-di-isopropylbenzoic acid, and 2-chloro-6-nitrobenzoic acid. There is thus isolated as the water soluble potassium salts the following acids: 7-(2,6-dibromophenylcarboxyamido)-cephalosporanic acid, 7 - (2,6 - diethylphenylcarboxyamido) - cephalosporanic acid, 7 -(2,6 - di - isopropylphenylcarboxyamido) - cephalosporanic acid, and 7-(2-chloro-6-nitrophenylcarboxyamido)-cephalosporanic acid.

*Example 6*

3-hydroxymethyl-7-aminodecephalosporanic acid lactone (2.28 g.) is reacted with the ethylformate mixed anhydride of 2,6-dimethoxybenzoic acid according to the initial procedures of Example 3. The reaction mixture is then extracted with butyl acetate and these organic extracts next concentrated to a residue comprising 3-hydroxymethyl - 7 - (2,6 - dimethoxyphenylcarboxyamido) - decephalosporanic acid lactone which is further purified by recrystallization from ether.

In a similar manner the other 2,6-disubstituted benzoic acids described herein may be employed in place of 2,6-dimethoxybenzoic acid to obtain the corresponding 7-disubstituted phenylcarboxyamido derivatives of 3-hydroxymethyldecephalosporanic acid lactone.

*Example 7*

In an analogous fashion, equivalent amounts of 3-pyridiniummethyl-7-aminodecephalosporanic acid inner salt are employed in place of 7-aminocephalosporanic acid in the procedure of Example 3A and it is thus obtained upon completion of the steps therein described the compound 3 - pyridiniummethyl - 7 - (2,6 - dimethoxyphenylcarboxyamido)-decephalosporanic acid inner salt.

Likewise, the other 2,6-disubstituted benzoic acids recited herein such as for example 2,6-dichlorobenzoic acid, 2,6-diethoxybenzoic acid and 2,6-dimethylbenzoic acid are treated with 3-pyridiniummethyl-7-aminodecephalosporanic acid in the manner herein described. There are thus obtained, for example, the compounds 3-pyridiniummethyl - 7 - (2,6 - dichlorophenylcarboxyamido) - decephalosporanic acid inner salt, 3-pyridiniummethyl-7-(2, 6-diethoxyphenylcarboxyamido)-decephalosporanic acid inner salt, and 3-pyridiniummethyl-7-(2,6-dimethylphenylcarboxyamido)-decephalosporanic acid inner salt.

*Example 8*

A preparation of acetylesterase obtained from the peels of 72 oranges according to the procedure of Jansen et al., Arch. Biochem. 15, 415 (1947) is added to 1 g. of 7-(2,6-dimethoxyphenylcarboxyamido)-cephalosporanic acid dissolved in 15 ml. of water. The pH 1 is adjusted to 6 and maintained at or above this level for 15 hours. At the end of this time, the solution is passed through an IR 4B column (in the acetate form) and eluted with aqueous 0.1 M acetic acid which has been adjusted to pH 5.5 by the addition of pyridine. The solutions collected by development of the column are adjusted to pH 8 by the addition of sodium hydroxide and this alkaline mixture is evaporated in vacuo to yield 3-hydroxymethyl-7-(2,6-dimethoxyphenylcarboxyamido)-decephalosporanic acid as the sodium salt.

To 1 g. of 3-hydroxymethyl-7-(2,6-dimethoxyphenylcarboxyamido)-decephalosporanic acid in 10 ml. of collidine are added 15 ml. of propionyl chloride. The mixture is allowed to stand for 10 hours and at the end of this time poured into 25 ml. of ice water. The solid which is thus formed is collected by filtration, recrystallized from dimethylformamide and dried to yield 3-propionyloxymethyl - 7 - (2,6 - dimethoxyphenylcarboxyamido)-decephalosporanic acid. In a similar fashion other lower alkanoyl chlorides such as butanoyl chloride or pentanoyl chloride may be employed in place of propionyl chloride obtaining the corresponding compounds, 3-butanoyloxy - 7 - (2,6 - dimethoxyphenylcarboxyamido) - decephalosporanic acid and 3-pentanoyloxymethyl-7-(2,6-dimethoxyphenylcarboxyamido)-decephalosporanic acid.

In an analogous fashion benzoyl chloride is employed in the place of these lower alkanoyl chlorides and it is thus obtained 3-benzoyloxymethyl-7-(2,6-dimethoxyphenylcarboxyamido)-decephalosporanic acid.

By substituting 7-(2,6-dichlorophenylcarboxyamido)-cephalosporanic acid, 7-(2,-6-dimethylphenylcarboxyamido)-cephalosporanic acid and 7-(2,6-diethoxyphenylcarboxyamido)-cephalosporanic acid, there are respectively obtained upon subjecting them to the present example the compound 3 - propionyloxymethyl-7-(2,6-dichlorophenylcarboxyamido)-decephalosporanic acid, 3-propionylmethyl - 7 - (2,6 - dimethylphenylcarboxyamido) - decephalosporanic acid and 3 - propionyloxymethyl - 7 -(2, 6-diethoxyphenylcarboxyamido)-decephalosporanic acid.

In a similar manner by employing benzoyl chloride, the corresponding benzoate esters of the above compounds are prepared.

*Example 9*

One gram of 7-(2,6-dimethoxyphenylcarboxyamido)-cephalosporanic acid is dissolved in excess amyl acetate and to the solution is added 10 g. N-ethylpiperidine. The solution is stirred for 30 minutes and the crystals formed upon standing are collected by filtration and dried to yield the N-ethylpiperidine salt of 7-(2,6-dimethoxyphenylcarboxamido)-cephalosporanic acid.

*Example 10*

Triethylamine is substituted for N-ethylpiperidine in the procedure of Example 9 and there is thus obtained upon the execution of the steps therein described the triethylamine salt of 7-(2,6-dimethoxyphenylcarboxyamido)-cephalosporanic acid.

We claim:

1. Compounds having the structural formula:

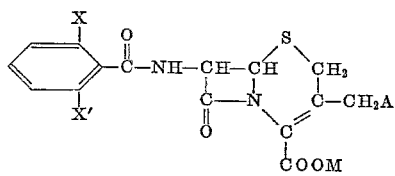

wherein X and X' are members selected from the group consisting of halogen, lower alkyl, lower alkoxy, nitro, benzyl, phenoxy and benzyloxy; A is a member selected from the group consisting of lower alkanoyloxy, benzoyloxy, hydroxy, N-pyridinium, and when taken together with M a monovalent carbon-oxygen bond; and M is selected from the group consisting of hydrogen, an anionic charge when A is pyridinium, a monovalent carbon-oxygen bond when taken together with A, and a pharmaceutically acceptable nontoxic cation selected from the group consisting of alkali metal cations and lower alkyl amine cations.

2. Compounds having the structure:

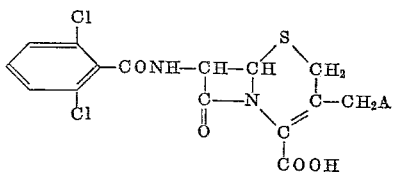

wherein A is lower alkanoyloxy.

3. Compounds of the structural formula:

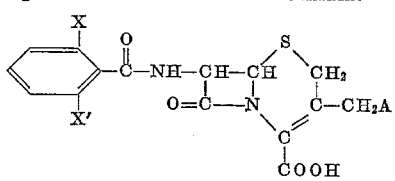

wherein X and X' are lower alkoxy and A is lower alkanoyloxy.

4. Compounds according to claim 3 wherein X and X' are methoxy.

5. Compounds of the structural formula:

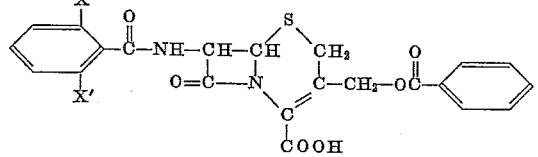

wherein X and X' are lower alkoxy.

6. Compounds according to claim 5 wherein X and X' are methoxy.

7. 7 - (2,6 - dimethoxyphenylcarboxyamido)-cephalosporanic acid.

8. The pharmaceutically acceptable non-toxic salts of 7 - (2,6 - dimethoxyphenylcarboxyamido) - cephalosporanic acid wherein said salts are selected from the group consisting of alkali metal salts and lower alkyl amine salts.

References Cited by the Examiner

Burger, Medicinal Chemistry, pages 46–48 (1960).
Jour. Amer. Medical Assoc., page 466, May 24, 1958.
Morton, The Chemistry of Heterocyclic Compounds, page VI of preface, 1946.

NICHOLAS S. RIZZO, *Primary Examiner.*

H. J. LIDOFF, *Examiner.*